(12) United States Patent
Brandon et al.

(10) Patent No.: US 11,774,968 B2
(45) Date of Patent: Oct. 3, 2023

(54) POWER MODING FOR REDUCTION OF VEHICLE POWER CONSUMPTION

(71) Applicant: GM Cruise Holdings LLC, San Francisco, CA (US)

(72) Inventors: Jeffrey Brandon, Phoenix, AZ (US); Chase Kaufman, Scottsdale, AZ (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 0 days.

(21) Appl. No.: 18/159,231

(22) Filed: Jan. 25, 2023

(65) Prior Publication Data
US 2023/0161346 A1 May 25, 2023

Related U.S. Application Data

(63) Continuation of application No. 16/780,191, filed on Feb. 3, 2020, now Pat. No. 11,592,821.

(51) Int. Cl.
| | |
|---|---|
| *G05D 1/00* | (2006.01) |
| *B60H 1/00* | (2006.01) |
| *G05D 1/02* | (2020.01) |

(52) U.S. Cl.
CPC ....... *G05D 1/0088* (2013.01); *B60H 1/00642* (2013.01); *G05D 1/0231* (2013.01); *G05D 1/0278* (2013.01); *G05D 2201/0213* (2013.01)

(58) Field of Classification Search
CPC .... G05D 1/0088; G05D 1/0291; G06F 17/18; G07C 5/006; G07C 5/0808
See application file for complete search history.

(56) References Cited

U.S. PATENT DOCUMENTS

| | | | |
|---|---|---|---|
| 8,284,039 B2 * | 10/2012 | Baker | G07C 5/008 340/5.1 |
| 2009/0224869 A1 * | 9/2009 | Baker | G07C 5/008 340/5.1 |
| 2017/0123421 A1 * | 5/2017 | Kentley | G06Q 10/00 |
| 2018/0178741 A1 * | 6/2018 | Poeppel | B60R 16/0236 |
| 2018/0373268 A1 * | 12/2018 | Antunes Marques Esteves | H04W 4/023 |

* cited by examiner

*Primary Examiner* — Ramsey Refai
(74) *Attorney, Agent, or Firm* — Akona IP (57) ABSTRACT

The present disclosure provides a method including determining an operational mode of a vehicle based on data accumulated from at least one vehicle information system associated with the vehicle; selecting one of a plurality of power consumption profiles for the vehicle based on the determined operational mode; and applying the selected one of the power consumption profiles to the vehicle.

20 Claims, 4 Drawing Sheets

POWER MODING FOR REDUCTION OF VEHICLE POWER CONSUMPTION

CROSS-REFERENCE TO RELATED APPLICATION

This application claims the benefit of and hereby incorporates by reference, for all purposes, the entirety of the contents of U.S. Nonprovisional application Ser. No. 16/780,191, filed Feb. 3, 2020, and entitled, "POWER MODING FOR REDUCTION OF VEHICLE POWER CONSUMPTION".

TECHNICAL FIELD OF THE DISCLOSURE

The present disclosure relates generally to autonomous vehicles (AVs) and, more specifically, to systems and methods for power moding and profiling for improving operation and efficiency of such vehicles.

BACKGROUND

Autonomous vehicles may operate in one of a number of different operational modes in a given day. For example, a single vehicle may be parked, performing a rideshare (with or without passengers), and out of service, to name a few. Typically, the power draw (or consumption) of the vehicle remains the same regardless of the vehicle's operating status.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

The systems, methods and devices of this disclosure each have several innovative aspects, no single one of which is solely responsible for the all of the desirable attributes disclosed herein. Details of one or more implementations of the subject matter described in this specification are set forth in the description below and the accompanying drawings.

Embodiments of the present disclosure provide system and method for implementing power moding techniques to reduce the overall power consumption of a vehicle. In particular, by adjusting a power profile of a vehicle based on a determined operating status (or mode) of the vehicle, the overall power draw of the vehicle can be reduced. Reduction in power draw results in a reduction in operating cost of the vehicle, as well as improved life of the vehicle's Rechargeable Energy Storage System (RESS), or battery, due to less power being moved through the battery.

Embodiments of the present disclosure also provide a method including determining an operational mode of a vehicle based on data accumulated from at least one vehicle information system associated with the vehicle; selecting one of a plurality of power consumption profiles for the vehicle based on the determined operational mode; and applying the selected one of the power consumption profiles to the vehicle.

Embodiments of the present disclosure further provide a method including continuously monitoring an operational mode of an autonomous vehicle (AV); detecting a change in the operational mode of the AV; determining a current operational mode of the AV, wherein the determining is performed based on data received from at least one vehicle information system associated with the vehicle; selecting one of a plurality of power consumption profiles for the AV based on the determined operational mode and at least one additional factor; and applying the selected one of the power consumption profiles to the vehicle.

Embodiments of the present disclosure still further provide an AV including an onboard computer; a sensor suite comprising a plurality of imaging and sensing devices; and a power moding system. The power moding system is configured to determine an operational mode of a vehicle based on data accumulated from at least one vehicle information system associated with the vehicle, wherein the at least one vehicle information system comprises at least one of a sensor suite, an onboard computer, a mapping information system, a GPS system, a vehicle coordinator, a remote expert interface, and a remote system; select one of a plurality of power consumption profiles for the vehicle based on the determined operational mode; and apply the selected one of the power consumption profiles to the vehicle.

As will be appreciated by one skilled in the art, aspects of the present disclosure, in particular aspects of a perception system for an autonomous vehicle, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the following description and the claims.

Figure 1:
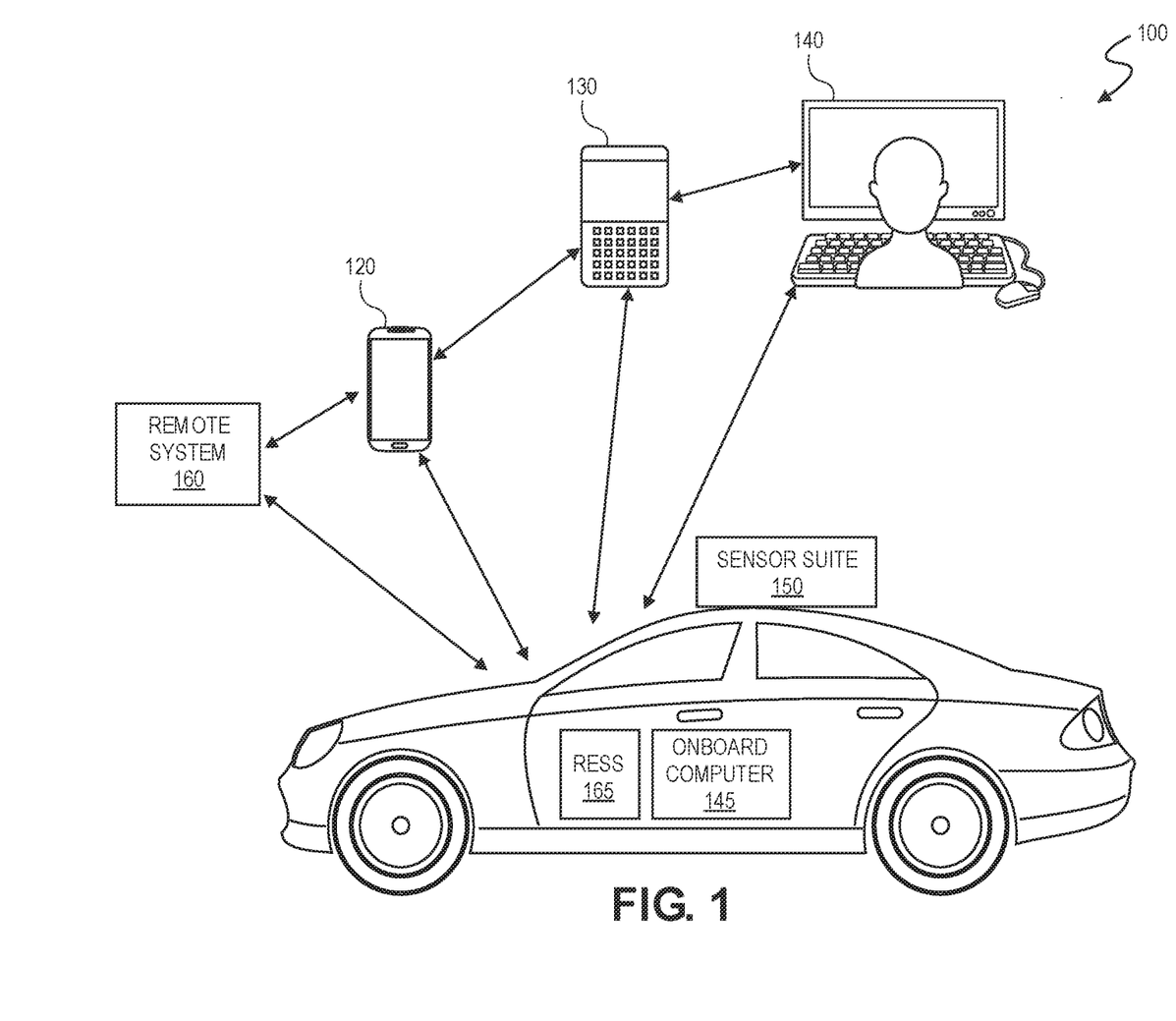
FIG. 1 is a block diagram illustrating an example autonomous vehicle in which a power moding system for reduction of vehicle power draw according to some embodiments of the present disclosure may be implemented.

One embodiment is a system for using power moding techniques for reduction of vehicle power draw. The power moding system determines an operational state of an autonomous vehicle and then adjusts a power consumption profile of the vehicle based on the determined operational state. As shown in FIG. 1, a power moding system 100 embodying features described herein includes an autonomous vehicle 110 that may include a passenger interface 120, a vehicle coordinator 130, and/or a remote expert interface 140. In certain embodiments, the remote expert interface 140 allows a non-passenger entity to set and/or modify the behavior settings of the autonomous vehicle 110. The non-passenger entity may be different from the vehicle coordinator 130, which may be a server.

A remote control facility 160, which may comprise a central office or back office facility, may also be provided for providing the autonomous vehicle 110 (and particularly, the onboard computer 145) with a number of different system backend functions. The remote control facility 160 may include one or more switches, servers, databases, live advisors, and/or an automated voice response system ("VRS"). Remote control facility 160 may include any or all of the aforementioned components, which may be coupled to one another via a wired or wireless local area network (LAN). Remote control facility 160 may receive and transmit data via one or more appropriate devices and network from and to the autonomous vehicle 110, such as by wireless systems, such as 882.11x, GPRS, and the like. A database at the remote control facility 160 can store account information such as subscriber authentication information, vehicle identifiers, profile records, behavioral patterns, and other pertinent subscriber information. The remote control facility 160 may also include a database of roads, routes, locations, etc. permitted for use by autonomous vehicle 110. The remote control facility 160 may communicate with the autonomous vehicle 110 to provide route guidance in response to a request received from the vehicle.

For example, based upon information stored in a mapping system of the remote control facility 160, the remote control facility may determine the conditions of various roads or portions thereof. Autonomous vehicles, such as the autonomous vehicle 110, may, in the course of determining a navigation route, receive instructions from the remote control facility 160 regarding which roads or portions thereof, if any, are appropriate for use under certain circumstances, as described hereinbelow. Such instructions may be based in part on information received from the autonomous vehicle 110 or other autonomous vehicles regarding road conditions. Accordingly, remote control facility 160 may receive information regarding the roads/routes generally in real-time from one or more vehicles.

The system 100 functions to adjust a power consumption profile, or power profile, of the autonomous vehicle 110 in response to a current operating status, or operating mode, of the vehicle, in order to reduce the overall amount of power consumed by the autonomous vehicle, thereby to decrease vehicle (and fleet) operating costs and extend the life of an RESS 165 of the autonomous vehicle.

The autonomous vehicle 110 is preferably a fully autonomous automobile, but may additionally or alternatively be any semi-autonomous or fully autonomous vehicle; e.g., a boat, an unmanned aerial vehicle, a driverless car, etc. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle.

In some embodiments, the autonomous vehicle 110 may optionally include one or more of a throttle interface that controls an engine throttle, motor speed (e.g., rotational speed of electric motor), or any other movement-enabling mechanism; a brake interface that controls brakes of the autonomous vehicle (or any other movement-retarding mechanism); and a steering interface that controls steering of the autonomous vehicle (e.g., by changing the angle of wheels of the autonomous vehicle). The autonomous vehicle 110 may additionally or alternatively include interfaces for control of any other vehicle functions; e.g., windshield wipers, headlights, turn indicators, air conditioning, etc. One or more of the aforementioned interfaces, if deployed, may be controlled via human or non-human driver input.

In addition, the autonomous vehicle 110 preferably includes an onboard computer 145 and a sensor suite 150

(e.g., computer vision ("CV") system, Light Detection and Ranging (LIDAR), Radio Detection and Ranging (RADAR), wheel speed sensors, Global Positioning System (GPS), cameras, etc.). The onboard computer 145 functions to control the autonomous vehicle 110 and processes sensed data from the sensor suite 150 and/or other sensors in order to determine the operational state of the autonomous vehicle 110. Based upon the vehicle operational state and programmed instructions, the onboard computer 145 preferably modifies or controls driving behavior of the autonomous vehicle 110.

Driving behavior may include any information relating to how an autonomous vehicle drives (e.g., actuates brakes, accelerator, steering) given a set of instructions (e.g., a route or plan). Driving behavior may include a description of a controlled operation and movement of an autonomous vehicle and the manner in which the autonomous vehicle applies traffic rules during one or more driving sessions. Driving behavior may additionally or alternatively include any information about how an autonomous vehicle calculates routes (e.g., prioritizing fastest time vs. shortest distance), other autonomous vehicle actuation behavior (e.g., actuation of lights, windshield wipers, traction control settings, etc.) and/or how an autonomous vehicle responds to environmental stimulus (e.g., how an autonomous vehicle behaves if it is raining, or if an animal jumps in front of the vehicle). Some examples of elements that may contribute to driving behavior include acceleration constraints, deceleration constraints, speed constraints, steering constraints, suspension settings, routing preferences (e.g., scenic routes, faster routes, no highways), lighting preferences, action profiles (e.g., how a vehicle turns, changes lanes, or performs a driving maneuver), and action frequency constraints (e.g., how often a vehicle changes lanes).

The onboard computer 145 functions to control the operations and functionality of the autonomous vehicle 110 and processes sensed data from the sensor suite 150 and/or other sensors in order to determine states of the autonomous vehicle. Based upon the vehicle state and programmed instructions, the onboard computer 145 preferably modifies or controls behavior of autonomous vehicle 110. The onboard computer 145 is preferably a general-purpose computer adapted for I/O communication with vehicle control systems and sensor systems, but may additionally or alternatively be any suitable computing device. The onboard computer 145 is preferably connected to the Internet via a wireless connection (e.g., via a cellular data connection). Additionally or alternatively, the onboard computer 145 may be coupled to any number of wireless or wired communication systems.

The sensor suite 150 preferably includes localization and driving sensors; e.g., photodetectors, cameras, RADAR, Sound Navigation Ranging (SONAR), LIDAR, GPS, inertial measurement units (IMUS), accelerometers, microphones, strain gauges, pressure monitors, barometers, thermometers, altimeters, etc.

Figure 2:
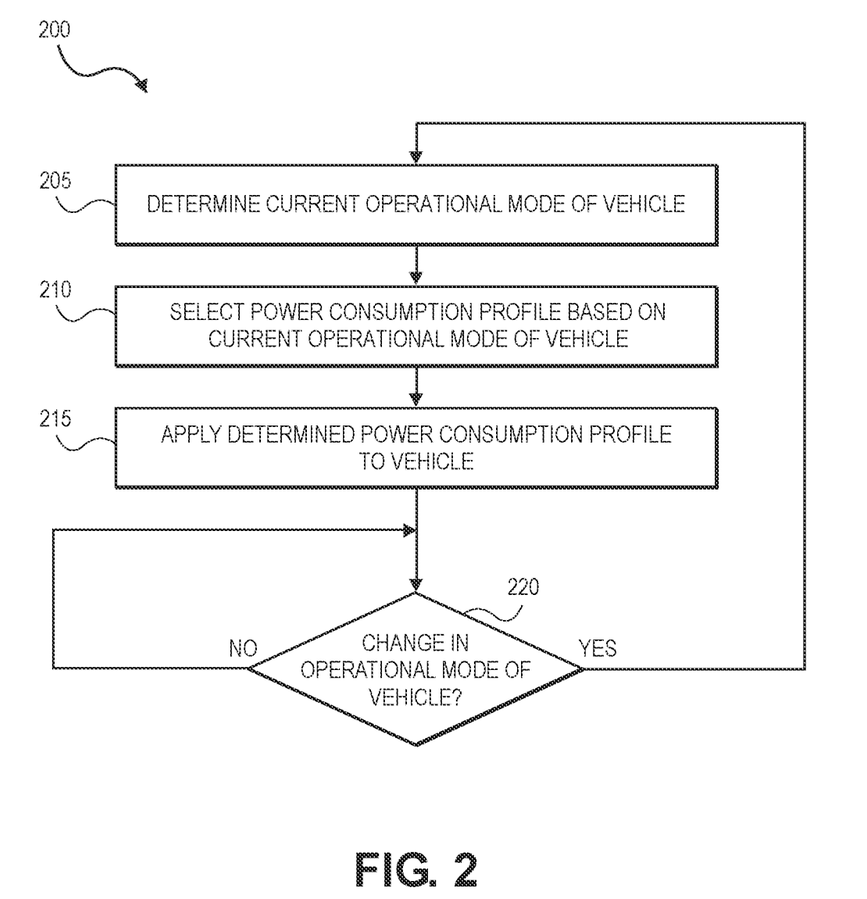
FIG. 2 is a flowchart of an example method implemented by an example power moding system according to some embodiments of the present disclosure.

FIG. 2 is a flowchart of an example method 200 implemented by an example power moding system for an autonomous vehicle according to some embodiments described herein. Referring to FIG. 2, in step 205, a current operating status, or "operational mode," of the autonomous vehicle (e.g., autonomous vehicle 110) is determined. Examples of possible autonomous vehicle operational modes will be described in greater detail below with reference to FIG. 3. In certain embodiments, the operational mode of the vehicle may be determined by processing and analyzing data from a variety of sources collectively referred to as "vehicle information systems," which may include but are not limited to the vehicle's sensors and onboard computer, mapping/GPS information, a vehicle coordinator, a remote expert interface, and a remote system, for example.

In step 210, an autonomous vehicle power consumption profile is determined based on the current operational mode of the autonomous vehicle determined in step 205. Examples of possible autonomous vehicle power consumption profiles will also be described in greater detail below with reference to FIG. 3. In step 215, the power consumption profile determined in step 210 is applied to the autonomous vehicle. In step 220, the operational mode of the autonomous vehicle continues to be monitored until a change in the operational mode is detected, at which point, execution returns to step 205.

Figure 3:
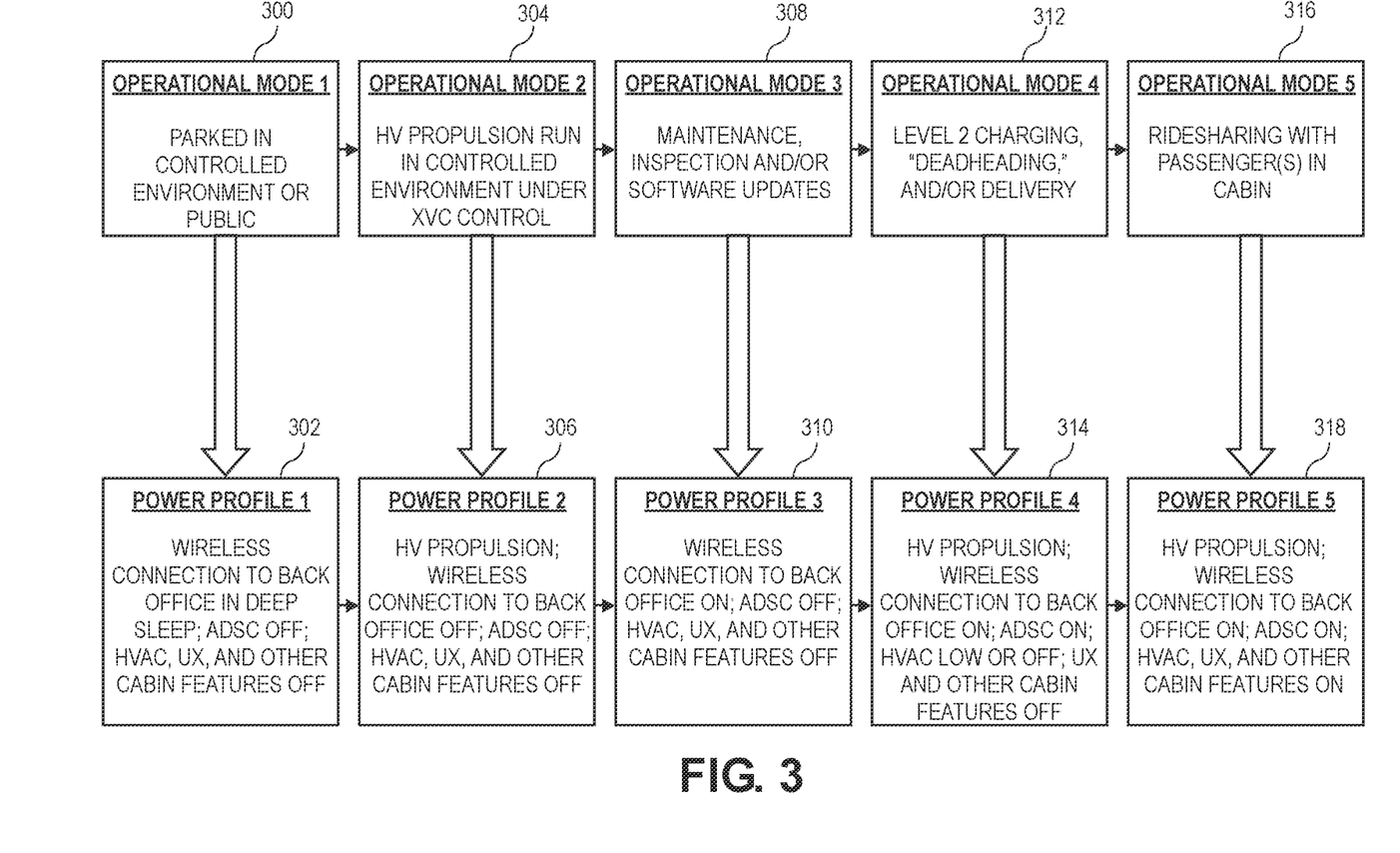
FIG. 3 illustrates example operational modes and corresponding example power profiles that may be implemented in connection with a power moding system according to some embodiments of the present disclosure.

FIG. 3 illustrates example operational modes and corresponding power consumption profiles that may be implemented by a power moding system in accordance with embodiments described herein. It should be noted at the outset that the particular operational modes and power profiles shown in and described with reference to FIG. 3 are neither mandatory nor exhaustive and are presented solely for purposes of illustrating example operation of embodiments described herein. As shown in FIG. 3, a first example operational mode ("OPERATIONAL MODE 1") is designated by a reference numeral 300 and corresponds to a first example power profile ("POWER PROFILE 1"), designated by a reference numeral 302. As shown in FIG. 3, in the first operational mode 300, the autonomous vehicle is parked (e.g., in a controlled environment (such as a testing facility) or in public). Accordingly, in the corresponding first power profile 302, the vehicle's wireless connection to the back office may be placed the a deep sleep mode, the vehicle's on-board computer (Autonomous Drive System Computer (ADSC)) and sensors may be powered off, and the vehicle's Heating Ventilation and Air Conditioning (HVAC) system, user interface (UX), and other cabin features may be powered off, thus resulting in substantial power savings.

Referring again to FIG. 3, a second example operational mode ("OPERATIONAL MODE 2") is designated by a reference numeral 304 and corresponds to a second example power profile ("POWER PROFILE 2"), designated by a reference numeral 306. As shown in FIG. 3, in the second operational mode 304, the autonomous vehicle is being piloted in a high voltage (HV) propulsion run using eXternal Vehicle Controller (XVC) in a controlled environment (such as a testing facility). Accordingly, in the corresponding second power profile 306, the vehicle's wireless connection to the back office may be turned off, the vehicle's ADSC and sensors may be powered off, and the vehicle's HVAC system, user interface (UX), and other cabin features may be powered off, thus resulting in significant power savings.

Referring again to FIG. 3, a third example operational mode ("OPERATIONAL MODE 3") is designated by a reference numeral 308 and corresponds to a third example power profile ("POWER PROFILE 3"), designated by a reference numeral 310. As shown in FIG. 3, in the second operational mode 308, the autonomous vehicle is undergoing maintenance, inspection and/or software updates (typically in a controlled environment). Accordingly, in the corresponding second power profile 310, the vehicle's wireless connection to the back office may be turned on, the vehicle's ADSC and sensors may be powered off, and the vehicle's HVAC system, user interface (UX), and other cabin features may be powered off, thus resulting in positive power savings.

Referring again to FIG. 3, a fourth example operational mode ("OPERATIONAL MODE 4") is designated by a reference numeral 312 and corresponds to a fourth example power profile ("POWER PROFILE 4"), designated by a reference numeral 314. As shown in FIG. 3, in the fourth operational mode 312, the autonomous vehicle is operating in a limited public (or "passengerless") mode using HV propulsion, which may include, for example, making a delivery and/or "deadheading" (i.e., operating without a passenger or passengers in the vehicle cabin), or simply parked at a charging station (during which time HV propulsion would not be occurring). Accordingly, in the corresponding fourth power profile 314, both the vehicle's wireless connection to the back office and the vehicle's ADSC and sensors may be powered on to enable full autonomous driving functionality, while the vehicle's HVAC, user interface (UX), and other cabin features may be powered off or may be operating in a limited mode, thus resulting in some power savings over full operation. It should be noted that this mode (and corresponding power profile) may actually viewed as comprising a variety of sub-modes/sub-profiles, that correspond to whether and what level of HVAC and other cabin features may be necessary to facilitate the intent of the vehicle. For example, if the vehicle is charging on its way to pick up a passenger, the HVAC may not be turned totally off but moderated, based on the temperature (e.g., as sensed by interior and/or exterior vehicle sensors) so that the vehicle cabin is not uncomfortably hot/cold for the passenger when s/he enters. Similarly, if an item being delivered is susceptible to extreme heat or cold, the HVAC may also be moderated in the manner just described so as not to negatively affect the item being delivered.

Referring again to FIG. 3, a fifth example operational mode ("OPERATIONAL MODE 5") is designated by a reference numeral 316 and corresponds to a fifth example power profile ("POWER PROFILE 5"), designated by a reference numeral 318. As shown in FIG. 3, in the fifth operational mode 316, the autonomous vehicle is operating in full public (or "passenger") mode using HV propulsion. Accordingly, in the corresponding fifth power profile 318, both the vehicle's wireless connection to the back office and the vehicle's ADSC and sensors may be powered on to enable full autonomous driving functionality. Additionally, the vehicle's HVAC, user interface (UX), and other cabin features are also in full operational mode, resulting in the maximum power consumption.

Although as illustrated in FIG. 3, there exists a one-to-one correspondence between operational modes and power profiles, it will be recognized that other configurations are anticipated in which multiple operational modes may correspond to a single power profile and/or a single operational mode may correspond to more than one power profile, with the selection of the appropriate power profile for a particular operational mode being influenced by other factors, which may include perceived and/or actual environmental conditions (e.g., as detected by the sensor suite), safety considerations, vehicle intent, an anticipated operational mode, and/or geographic location, for example.

In summary, embodiments described herein enable a reduction in UX and HVAC loads when the vehicle is not carrying a passenger, an ability to shut down sensors when not needed, and the ability to reduce the wireless back office connection and ADSC to minimum required function for remote wakeup command in certain operational modes.

Figure 4:
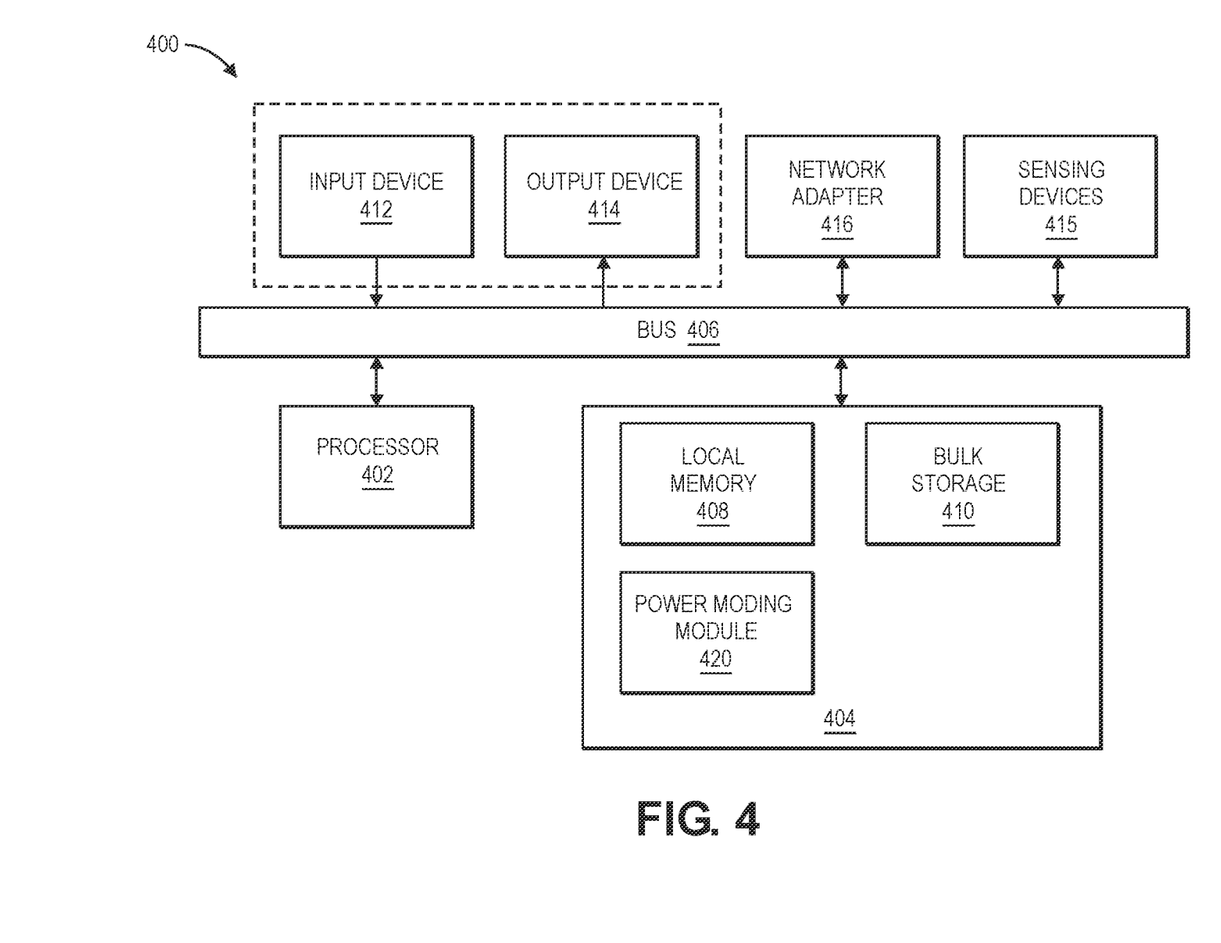
FIG. 4 is a block diagram of a computer system that may be deployed in implementing a power moding system for an autonomous vehicle according to some embodiments of the present disclosure.

FIG. 4 is a block diagram illustrating an example system 400 that may be configured to implement at least portions of power moding system for an autonomous vehicle, such as the autonomous vehicle 110, in accordance with embodiments described herein, and more particularly as shown in the FIGURES described hereinabove. Part or all of the intelligent delivery system 400 may be implemented as a sensor suite, such as the sensor suite 150, and/or an onboard vehicle control system, such as onboard computer 145, and/or a remote vehicle control system, such as remote control facility 160. As shown in FIG. 4, the intelligent delivery system 400 may include at least one processor 402, e.g. a hardware processor 402, coupled to memory elements 404 through a system bus 406. As such, the system may store program code and/or data within memory elements 404. Further, the processor 402 may execute the program code accessed from the memory elements 404 via a system bus 406. In one aspect, the system may be implemented as a computer that is suitable for storing and/or executing program code (e.g., onboard computer 145). It should be appreciated, however, that the system 400 may be implemented in the form of any system including a processor and a memory that is capable of performing the functions described in this disclosure.

In some embodiments, the processor 402 can execute software or an algorithm to perform the activities as discussed in this specification; in particular, activities related to an intelligent delivery system for an autonomous vehicle in accordance with embodiments described herein. The processor 402 may include any combination of hardware, software, or firmware providing programmable logic, including by way of non-limiting example a microprocessor, a DSP, a field-programmable gate array (FPGA), a programmable logic array (PLA), an integrated circuit (IC), an application specific IC (ASIC), or a virtual machine processor. The processor 402 may be communicatively coupled to the memory element 404, for example in a direct-memory access (DMA) configuration, so that the processor 402 may read from or write to the memory elements 404.

In general, the memory elements 404 may include any suitable volatile or non-volatile memory technology, including double data rate (DDR) random access memory (RAM), synchronous RAM (SRAM), dynamic RAM (DRAM), flash, read-only memory (ROM), optical media, virtual memory regions, magnetic or tape memory, or any other suitable technology. Unless specified otherwise, any of the memory elements discussed herein should be construed as being encompassed within the broad term "memory." The information being measured, processed, tracked or sent to or from any of the components of the system 400 could be provided in any database, register, control list, cache, or storage structure, all of which can be referenced at any suitable timeframe. Any such storage options may be included within the broad term "memory" as used herein. Similarly, any of the potential processing elements, modules, and machines described herein should be construed as being encompassed within the broad term "processor." Each of the elements shown in the present figures may also include suitable interfaces for receiving, transmitting, and/or otherwise communicating data or information in a network environment so that they can communicate with, for example, a system having hardware similar or identical to another one of these elements.

In certain example implementations, mechanisms for implementing an intelligent delivery system for an autonomous vehicle as outlined herein may be implemented by logic encoded in one or more tangible media, which may be inclusive of non-transitory media, e.g., embedded logic provided in an ASIC, in DSP instructions, software (potentially inclusive of object code and source code) to be executed by a processor, or other similar machine, etc. In some of these instances, memory elements, such as e.g. the memory elements 404 shown in FIG. 4, can store data or information used for the operations described herein. This includes the memory elements being able to store software, logic, code, or processor instructions that are executed to carry out the activities described herein. A processor can execute any type of instructions associated with the data or information to achieve the operations detailed herein. In one example, the processors, such as e.g. the processor 402 shown in FIG. 4, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, a DSP, an erasable programmable read-only memory (EPROM), an electrically erasable programmable read-only memory (EEPROM)) or an ASIC that includes digital logic, software, code, electronic instructions, or any suitable combination thereof.

The memory elements 404 may include one or more physical memory devices such as, for example, local memory 408 and one or more bulk storage devices 410. The local memory may refer to RAM or other non-persistent memory device(s) generally used during actual execution of the program code. A bulk storage device may be implemented as a hard drive or other persistent data storage device. The processing system 400 may also include one or more cache memories (not shown) that provide temporary storage of at least some program code in order to reduce the number of times program code must be retrieved from the bulk storage device 410 during execution.

As shown in FIG. 4, the memory elements 404 may store a power moding module 420. In various embodiments, the module 420 may be stored in the local memory 408, the one or more bulk storage devices 410, or apart from the local memory and the bulk storage devices. It should be appreciated that the system 400 may further execute an operating system (not shown in FIG. 4) that can facilitate execution of the module 420. The module 420, being implemented in the form of executable program code and/or data, can be read from, written to, and/or executed by the system 400, e.g., by the processor 402. Responsive to reading from, writing to, and/or executing the module 420, the system 400 may be configured to perform one or more operations or method steps described herein.

Input/output (I/O) devices depicted as an input device 412 and an output device 414, optionally, may be coupled to the system. Examples of input devices may include, but are not limited to, a keyboard, a pointing device such as a mouse, or the like. Examples of output devices may include, but are not limited to, a monitor or a display, speakers, or the like. In some implementations, the system may include a device driver (not shown) for the output device 414. Input and/or output devices 412, 414 may be coupled to the system 400 either directly or through intervening I/O controllers. Additionally, sensing devices 415, may be coupled to the system 400. Examples of sensing devices 415 may include, but are not limited to, cameras (located inside and/or outside the vehicle), LIDARs, RADARS, scales, Quick Response (QR) code readers, bar code readers, RF sensors, and others. Sensing devices 415 may be coupled to the system 400 either directly or through intervening controllers and/or drivers.

Cameras may be implemented using high-resolution imagers with fixed mounting and field of view. LIDARs may be implemented using scanning LIDARs with dynamically configurable field of view that provides a point-cloud of the region intended to scan. RADARs may be implemented using scanning RADARs with dynamically configurable field of view.

In an embodiment, the input and the output devices may be implemented as a combined input/output device (illustrated in FIG. 4 with a dashed line surrounding the input device 412 and the output device 414). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 416 may also, optionally, be coupled to the system 400 to enable it to become coupled to other systems, computer systems, remote network devices, and/or remote storage devices through intervening private or public networks. The network adapter may comprise a data receiver for receiving data that is transmitted by said systems, devices and/or networks to the system 400, and a data transmitter for transmitting data from the system 400 to said systems, devices and/or networks. Modems, cable modems, and Ethernet cards are examples of different types of network adapter that may be used with the system 400.

Example 1 is a method including determining an operational mode of a vehicle based on data accumulated from at least one vehicle information system associated with the vehicle; selecting one of a plurality of power consumption profiles for the vehicle based on the determined operational mode; and applying the selected one of the power consumption profiles to the vehicle.

In Example 2, the method of Example 1 may further include monitoring the operational mode of the vehicle.

In Example 3, the method of any of Examples 1-2 may further include detecting a change in the operational mode of the vehicle; and triggering the determining the operational mode of the vehicle.

In Example 4, the method of any of Examples 1-3 may further include the at least one vehicle information system comprising at least one of a sensor suite, an onboard computer, a mapping information system, a GPS system, a vehicle coordinator, a remote expert interface, and a remote system.

In Example 5, the method of any of Examples 1-4 may further include the applying the selected one of the power consumption profiles comprising adjusting at least one of the vehicle's HVAC system and user interface.

In Example 6, the method of any of Examples 1-5 may further include the applying the selected one of the power consumption profiles comprising adjusting operation of an Autonomous Drive System Computer ("ADSC") of the vehicle.

In Example 7, the method of Examples 1-6 may further include the applying the selected one of the power consumption profiles comprising adjusting operation of a wireless connection of the vehicle to a back office.

In Example 8, the method of any of Examples 1-7 may further include the applying the selected one of the power consumption profiles comprising placing a wireless connection of the vehicle to the back office into a sleep mode, powering off an Autonomous Drive System Computer ("ADSC") of the vehicle, and powering off an HVAC system and user interface of the vehicle.

In Example 9, the method of any of Examples 1-8 may further include the applying the selected one of the power consumption profiles comprising powering off a wireless connection of the vehicle to the back office, powering off an Autonomous Drive System Computer ("ADSC") of the vehicle, and powering off an HVAC system and user interface of the vehicle.

In Example 10, the method of any of Examples 1-9 may further include the applying the selected one of the power consumption profiles comprising powering on a wireless connection of the vehicle to the back office, powering off an Autonomous Drive System Computer ("ADSC") of the vehicle, and powering off an HVAC system and user interface of the vehicle.

In Example 11, the method of any of Examples 1-10 may further include the applying the selected one of the power consumption profiles comprising powering on a wireless connection of the vehicle to the back office, powering on an Autonomous Drive System Computer ("ADSC") of the vehicle, and powering off an HVAC system and user interface of the vehicle.

In Example 12, the method of any of Examples 1-11 may further include the applying the selected one of the power consumption profiles comprising powering on a wireless connection of the vehicle to the back office, powering on an Autonomous Drive System Computer ("ADSC") of the vehicle, and powering on an HVAC system and user interface of the vehicle.

In Example 13, the method of any of Examples 1-12 may further include the selecting one of a plurality of power consumption profiles for the vehicle being further based on at least one additional factor comprising at least one of an environmental condition, a safety consideration, a geographic location, an intent of the vehicle, and an anticipated operational mode of the vehicle.

Example 14 is a method including continuously monitoring an operational mode of an autonomous vehicle (AV); detecting a change in the operational mode of the AV; determining a current operational mode of the AV, wherein the determining is performed based on data received from at least one vehicle information system associated with the vehicle; selecting one of a plurality of power consumption profiles for the AV based on the determined operational mode and at least one additional factor; and applying the selected one of the power consumption profiles to the vehicle.

In Example 15, the method of Example 14 may further include the at least one vehicle information system comprising at least one of a sensor suite, an onboard computer, a mapping information system, a GPS system, a vehicle coordinator, a remote expert interface, and a remote system.

In Example 16, the method of any of Examples 14-15 may further include the applying the selected one of the power consumption profiles comprising adjusting at least one of the vehicle's HVAC system and user interface.

In Example 17, the method of any of Examples 14-16 may further include the applying the selected one of the power consumption profiles comprising adjusting operation of an Autonomous Drive System Computer ("ADSC") of the vehicle.

In Example 18, the method of any of Examples 14-17 may further include the at least one additional factor comprising at least one of an environmental condition, a safety consideration, a geographic location, an intent of the vehicle, and an anticipated operational mode of the vehicle.

Example 19 is an autonomous vehicle ("AV") comprising an onboard computer; a sensor suite comprising a plurality of imaging and sensing devices; and a power moding system. The power moding system is configured to determine an operational mode of a vehicle based on data accumulated from at least one vehicle information system associated with the vehicle, wherein the at least one vehicle information system comprises at least one of a sensor suite, an onboard computer, a mapping information system, a GPS system, a vehicle coordinator, a remote expert interface, and a remote system; select one of a plurality of power consumption profiles for the vehicle based on the determined operational mode; and apply the selected one of the power consumption profiles to the vehicle.

In Example 20, the AV of Example 19 may further include the applying the selected one of the power consumption profiles comprising adjusting operation of at least one of the vehicle's HVAC system, user interface, wireless back office connection, and Autonomous Drive System Computer ("ADSC").

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the FIGS. may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits of the FIGS. may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the digital filters may be implemented in one or more silicon cores in Application Specific Integrated Circuits (ASICs), Field Programmable Gate Arrays (FPGAs), and other semiconductor chips.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGS. may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGS. and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

It is also important to note that the functions related to contactless current measurement using magnetic sensors, e.g. those summarized in the one or more processes shown in FIGS., illustrate only some of the possible functions that may be executed by, or within, the current measurement systems illustrated in the FIGS. Some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the apparatus described above may also be implemented with respect to the method or process described herein and specifics in the examples may be used anywhere in one or more embodiments.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A method comprising:
    determining in which operational mode of a plurality of operational modes a vehicle is currently operating;
    selecting one of a plurality of power consumption profiles for the vehicle based on a combination of the determined operational mode and at least one additional factor comprising one or more of an environmental condition, a safety consideration, a geographic location, an intent of the vehicle, and an anticipated new operational mode of the vehicle; and
    applying the selected one of the power consumption profiles to the vehicle by adjusting a level of operation a wireless connection between the vehicle and a remote system, one or more cabin features of the vehicle, and an automatic drive system computer (ADSC) of the vehicle.

2. The method of claim 1, wherein the plurality of operational modes includes:
    a first operational mode in which the vehicle is determined to be operating in a controlled environment;
    a second operational mode in which the vehicle is determined to be charging;
    a third operational mode in which the vehicle is determined to be making a delivery;
    a fourth operational mode in which the vehicle is determined to be deadheading; and
    a fifth operational mode in which the vehicle is determined to be transporting a passenger.

3. The method of claim 1, further comprising:
    detecting a change in the operational mode of the vehicle;
    subsequent to the detecting, determining a new operational mode of the vehicle;
    selecting a new one of the plurality of power consumption profiles based on the determined new operational mode; and
    applying the selected new one of the power consumption profiles to the vehicle.

4. The method of claim 1, wherein the determining is performed based on data accumulated from at least one of an onboard sensor suite, an onboard computer, a mapping information system, a GPS system, a vehicle coordinator, a remote expert interface, and a remote system.

5. The method of claim 1, wherein the one or more cabin features of the vehicle comprise the vehicle's heating, ventilation and cooling (HVAC) system and a user interface provided in the vehicle.

6. The method of claim 1, wherein the applying the selected one of the power consumption profiles comprises placing a wireless connection of the vehicle to the back office into a sleep mode, powering off an Autonomous Drive System Computer ("ADSC") of the vehicle, and powering off an HVAC system and user interface of the vehicle.

7. The method of claim 1, wherein the applying the selected one of the power consumption profiles comprises powering off a wireless connection of the vehicle to the back office, powering off an Autonomous Drive System Computer ("ADSC") of the vehicle, and powering off an HVAC system and user interface of the vehicle.

8. The method of claim 1, wherein the applying the selected one of the power consumption profiles comprises powering on a wireless connection of the vehicle to the back office, powering off an Autonomous Drive System Computer ("ADSC") of the vehicle, and powering off an HVAC system and user interface of the vehicle.

9. The method of claim 1, wherein the applying the selected one of the power consumption profiles comprises powering on a wireless connection of the vehicle to the back office, powering on an Autonomous Drive System Computer ("ADSC") of the vehicle, and powering off an HVAC system and user interface of the vehicle.

10. The method of claim 1, wherein the applying the selected one of the power consumption profiles comprises powering on a wireless connection of the vehicle to the back office, powering on an Autonomous Drive System Computer ("ADSC") of the vehicle, and powering on an HVAC system and user interface of the vehicle.

11. The method of claim 1, wherein the at least one additional factor further comprises a speed with which the vehicle can transition from the selected power consumption mode to a power consumption mode associated with the anticipated new operational mode of the vehicle.

12. The method of claim 1, wherein the at least one additional factor further comprises an amount of time in which the vehicle will remain in the determined operational mode before transitioning to the anticipated new operational mode.

13. A method comprising:
continuously monitoring an operational mode of an autonomous vehicle (AV);
determining in which operational mode of a plurality of operational modes a vehicle is currently operating;
selecting one of a plurality of power consumption profiles for the vehicle based on a combination of the determined operational mode and at least one additional factor comprising one or more of an environmental condition, a safety consideration, a geographic location, an intent of the vehicle, and an anticipated new operational mode of the vehicle; and
applying the selected one of the power consumption profiles to the vehicle by adjusting a level of operation a wireless connection between the vehicle and a remote system, one or more cabin features of the vehicle, and an automatic drive system computer (ADSC) of the vehicle.

14. The method of claim 13, wherein the plurality of operational modes includes:
a first operational mode in which the vehicle is determined to be operating in a controlled environment;
a second operational mode in which the vehicle is determined to be charging;
a third operational mode in which the vehicle is determined to be making a delivery;
a fourth operational mode in which the vehicle is determined to be deadheading; and
a fifth operational mode in which the vehicle is determined to be transporting a passenger.

15. The method of claim 13, wherein the determining is performed based on data accumulated from at least one of an onboard sensor suite, an onboard computer, a mapping information system, a GPS system, a vehicle coordinator, a remote expert interface, and a remote system.

16. The method of claim 13, wherein the one or more cabin features of the vehicle comprise the vehicle's heating, ventilation and cooling (HVAC) system and a user interface provided in the vehicle.

17. A vehicle comprising:
an onboard computer;
an onboard sensor suite comprising a plurality of imaging and sensing devices; and
a power moding system configured to:
determine in which operational mode of a plurality of operational modes a vehicle is currently operating;
select one of a plurality of power consumption profiles for the vehicle based on a combination of the determined operational mode and at least one additional factor comprising one or more of an environmental condition, a safety consideration, a geographic location, an intent of the vehicle, and an anticipated new operational mode of the vehicle; and
apply the selected one of the power consumption profiles to the vehicle by adjusting a level of operation a wireless connection between the vehicle and a remote system, one or more cabin features of the vehicle, and an automatic drive system computer (ADSC) of the vehicle.

18. The vehicle of claim 17, wherein the plurality of operational modes includes:
a first operational mode in which the vehicle is determined to be operating in a controlled environment;
a second operational mode in which the vehicle is determined to be charging;
a third operational mode in which the vehicle is determined to be making a delivery;
a fourth operational mode in which the vehicle is determined to be deadheading; and
a fifth operational mode in which the vehicle is determined to be transporting a passenger.

19. The vehicle of claim 17, wherein the power moding system is further configured to:
detect a change in the operational mode of the vehicle;
determine a new operational mode of the vehicle;
select a new one of the plurality of power consumption profiles based on the determined new operational mode; and
apply the selected new one of the power consumption profiles to the vehicle.

20. The vehicle of claim 17, wherein the determining is performed based on data accumulated from at least one of an onboard sensor suite, an onboard computer, a mapping information system, a GPS system, a vehicle coordinator, a remote expert interface, and a remote system.

* * * * *